United States Patent [19]

Eggleston

[11] Patent Number: 5,487,527
[45] Date of Patent: Jan. 30, 1996

[54] VALVE ACTUATOR

[75] Inventor: Philip W. Eggleston, Marshalltown, Iowa

[73] Assignee: Fisher Controls International, Inc., Clayton, Mo.

[21] Appl. No.: 252,926

[22] Filed: Jun. 2, 1994

[51] Int. Cl.$^6$ .................................................. F16K 31/122
[52] U.S. Cl. ........................... 251/62; 251/285; 92/117 A
[58] Field of Search ............................... 251/62, 341, 284, 251/285, 63, 63.5, 63.6; 92/117 A

[56] References Cited

U.S. PATENT DOCUMENTS

| | | |
|---|---|---|
| 2,731,534 | 1/1956 | Hansen et al. . |
| 3,084,901 | 4/1963 | Thorburn . |
| 3,516,442 | 6/1970 | Munroe . |
| 3,719,199 | 3/1973 | Mentink . |
| 3,719,343 | 3/1973 | Werra . |
| 3,958,592 | 5/1976 | Wells et al. . |
| 4,027,692 | 6/1977 | Bouteille et al. . |
| 4,364,414 | 12/1982 | Bouteille et al. . |
| 4,569,378 | 2/1986 | Bergandy . |
| 4,582,082 | 4/1986 | Tosseghini . |
| 4,809,733 | 3/1989 | Hawkins .............................. 251/62 X |
| 4,889,153 | 12/1989 | Zepernick et al. . |
| 4,930,555 | 6/1990 | Rudick . |
| 4,977,922 | 12/1990 | McWilliams . |
| 4,986,299 | 1/1991 | Schultz . |
| 5,275,014 | 1/1994 | Solomon . |
| 5,357,999 | 10/1994 | Loth et al. ............................. 251/62 X |

FOREIGN PATENT DOCUMENTS 56-63164  5/1981  Japan ........................................ 251/62

OTHER PUBLICATIONS

Fisher controls, "Type 657 and 667 Diaphragm Actuators", Bulletin 61.1:657, Apr. 1992.
Fisher Controls, "470 Series Piston Actutators", Bulletin 61.2:470, Jul. 1993.
Fisher Controls, "Tupe 585 and 585R Piston Actuators", Bulletin 61.2:585, Jul. 1993.

Primary Examiner—Martin P. Schwadron
Assistant Examiner—Kevin L. Lee
Attorney, Agent, or Firm—Marshall, O'Toole, Gerstein, Murray & Borun

[57] ABSTRACT

An actuator for fluid control valves with a reversible power module having a stationary inner member and a coaxially aligned movable outer member coupled to the valve flow control element and slidably movable on the inner member. A chamber is formed between respective ends of the members. Pneumatic pressure applied to the chamber drives the movable member to actuate the valve in a first direction. A spring returns the movable member in the second direction. A second chamber is defined within the inner member and pneumatic pressure applied to the second chamber drives the movable member with or without the spring.

15 Claims, 7 Drawing Sheets

VALVE ACTUATOR

This invention generally relates to fluid flow control devices and in particular to actuators for fluid flow control valves.

BACKGROUND OF THE INVENTION

A variety of fluid flow control valves and corresponding valve actuators are utilized for on/off control or throttling the flow of fluid, such as in a gas or oil pipeline system. The fluid flow control valves are typically sliding stem control valves or rotary action control valves and are operated by a valve actuator such as a pneumatic piston or diaphragm actuator responding to the output of a valve positioner for accurate throttling control of the valve.

For example, typically the fluid control valve is mounted in the pipeline system with the pneumatic actuator mounted on top of the valve and coupled to the valve fluid control element. If utilized, a positioner is mounted to the side of or above the actuator. Thus, the overall valve, actuator and positioner assembly can be a fairly large and heavy combination of elements extending for some distance above the valve and projecting therefore above the pipeline and possibly greatly beyond the valve itself.

It is desired to provide an actuator for fluid control valves of reduced height and weight and with fewer component parts so as to reduce manufacturing costs and hopefully increase operational reliability.

SUMMARY OF THE INVENTION

In accordance with the principles of the present invention, there is provided an actuator responsive to a driving force supplied by fluid under pressure to operate a mechanical control element, and which includes a stationary interior member, and a movable exterior member coaxially aligned with and movably mounted axially on the stationary member, with the movable member being coupled to the control element. A chamber is defined between the stationary interior member and the movable exterior member so that coupling the chamber to fluid pressure enables the moving member to axially move in a first direction thereby moving the mechanical control element. Return means move the movable member axially in a second direction.

In a preferred embodiment of the invention, there is provided a fluid pressure operated, such as a pneumatic air pressure operated valve actuator for a fluid control valve which includes a power module containing a stationary inner cylindrical member about which a movable outer cylindrical member slidably moves axially in response to pneumatic pressure input. The movable outer member is coupled to a valve flow control element. The movable outer member extends beyond each end of the stationary inner member to define a chamber between respective ends of the stationary member and the movable member. A passageway is provided into the chamber which communicates with an input port to enable a pneumatic pressure to be supplied to the chamber and thereby drive the movable outer cylindrical member to slidably move axially with respect to the stationary inner cylindrical member. This correspondingly moves the valve control element in a first direction. A return spring is mounted within the interior of the stationary inner member at one end and the opposite end of the movable outer member at the other end so that pneumatic operation of the valve actuator and moving the movable member in a first direction correspondingly compresses the spring. Upon relieving the pressure in the chamber, the compressed spring moves the movable exterior member and the coupled valve control element in the second direction.

Accordingly, the actuator of the present invention can be used as an on/off actuator or can be used in combination with a positioner in accurate throttling valve applications. Also, the actuator of the present invention can be applied to control either sliding stem valves or rotary shaft valves with appropriate motion transferring devices such as an eccentric crank, rack and pinion, or scotch yoke configurations.

In addition, in an alternative embodiment of the invention, a second port with a connecting passageway into a second chamber defined between the interior of the stationary inner member and a respective opposite end of the moving outer member can be coupled to a suitable pressure source to supply a return force sufficient to move the movable exterior member in the second direction without regard to the spring force. Accordingly, the present invention provides a very versatile actuator configuration adaptable for a variety of desired operations. The actuator for instance can be constructed to be double-acting (i.e. position controlled by two different inversely proportional pneumatic inputs); or spring return single-acting (i.e. a single pneumatic input opposed by a spring); or spring biased double-acting (i.e. double-acting with a spring to determine position in the event of pneumatic failure).

Furthermore, in either the spring return or spring biased configurations, the power module portion of the actuator with a stationary inner member and a driven outer member can be installed in either a direct acting configuration where for instance the spring force pushes up, or in the reverse acting configuration where for instance the spring force pushes down. Therefore, the change between a direct and reverse actuator action can readily be obtained by merely reorienting the power module within the actuator.

In a further alternative embodiment to the invention, a bladder with a bladder chamber is provided between respective ends of the stationary inner member and the movable exterior member. A passageway interconnects the bladder chamber interior with an inlet port so that supplying pneumatic pressure to the bladder chamber moves the exterior member in a first direction. A return spring is mounted between the stationary inner member and the movable outer member and is compressed during initial movement. When the initial pneumatic pressure is released from the bladder chamber to relieve the bladder chamber pressure, the compressed spring expands to move the movable outer member axially in a second direction.

The actuator of the present invention provides significant advantages over currently available actuators, which include its small compact size, the ability to reverse the power module or exchange power modules to change the actuator action or configuration and thereby provide desired versatility, and in utilizing a minimum of component parts. In addition, because there is an equal effective area of actuator operation in either direction, the actuator of the present invention provides equal force output in either direction. Also, using an inner stationary member and an outer member which can be movably driven axially on the stationary member provides increased and constant guiding support of the moving member. Also, the improved guiding support is maintained throughout the actuator stroking operation in contrast to prior available piston actuators where the guiding support of the piston changes significantly during piston stroking. Furthermore, where a valve positioner is used, the present actuator enables one to readily sense and obtain position feedback from the moving outer member which is a significant advantage over current piston actuators wherein it is difficult to do so because of the restricted access to the moving piston member.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
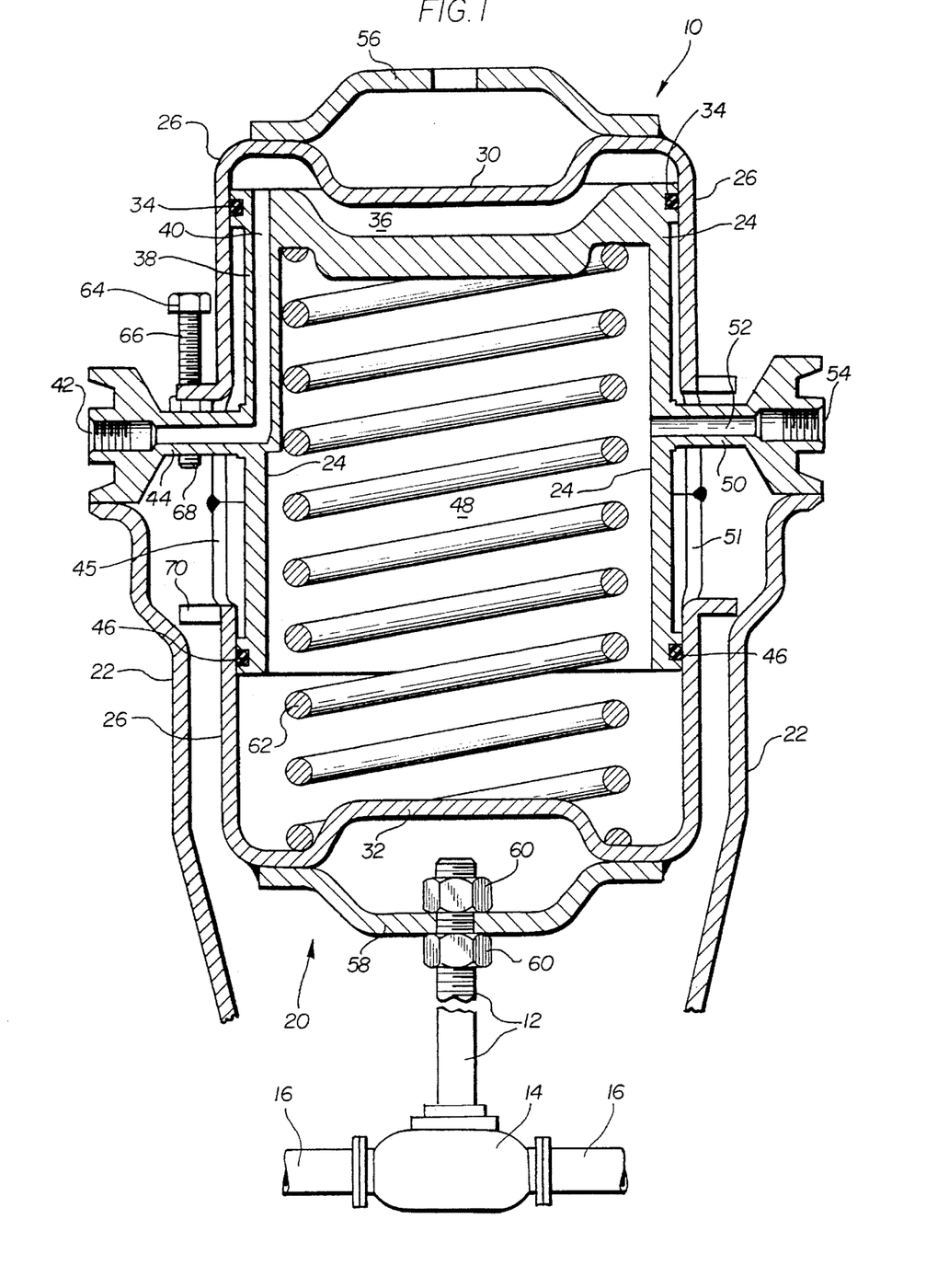
FIG. 1 is a schematic sectional diagram illustrating a valve actuator in accordance with the principles of the present invention.
Figure 2:
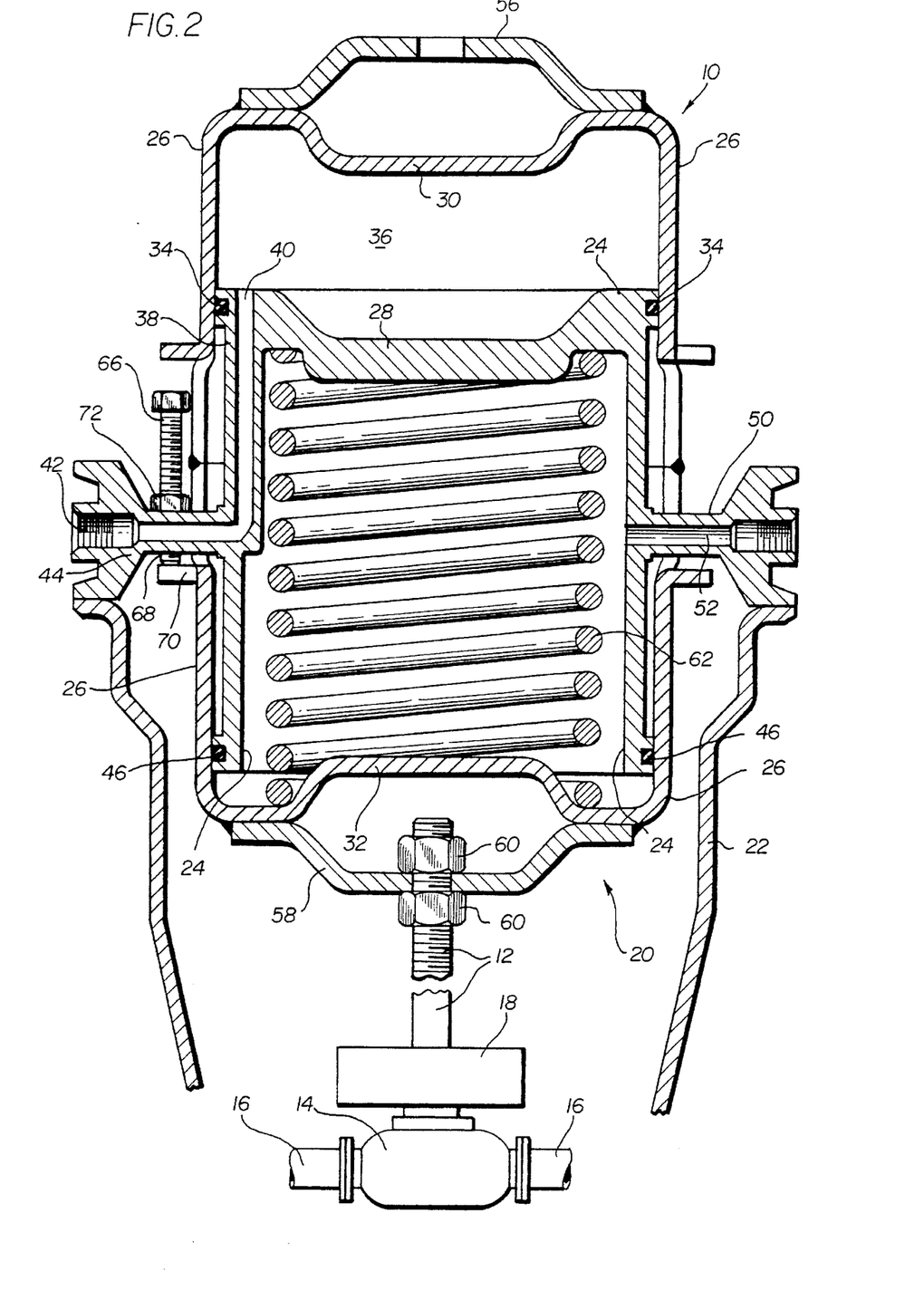
FIG. 2 is a schematic sectional diagram illustrating the valve actuator of FIG. 1 with the actuator movable outer member being movably driven upwardly with respect to a stationary member.
Figure 3:
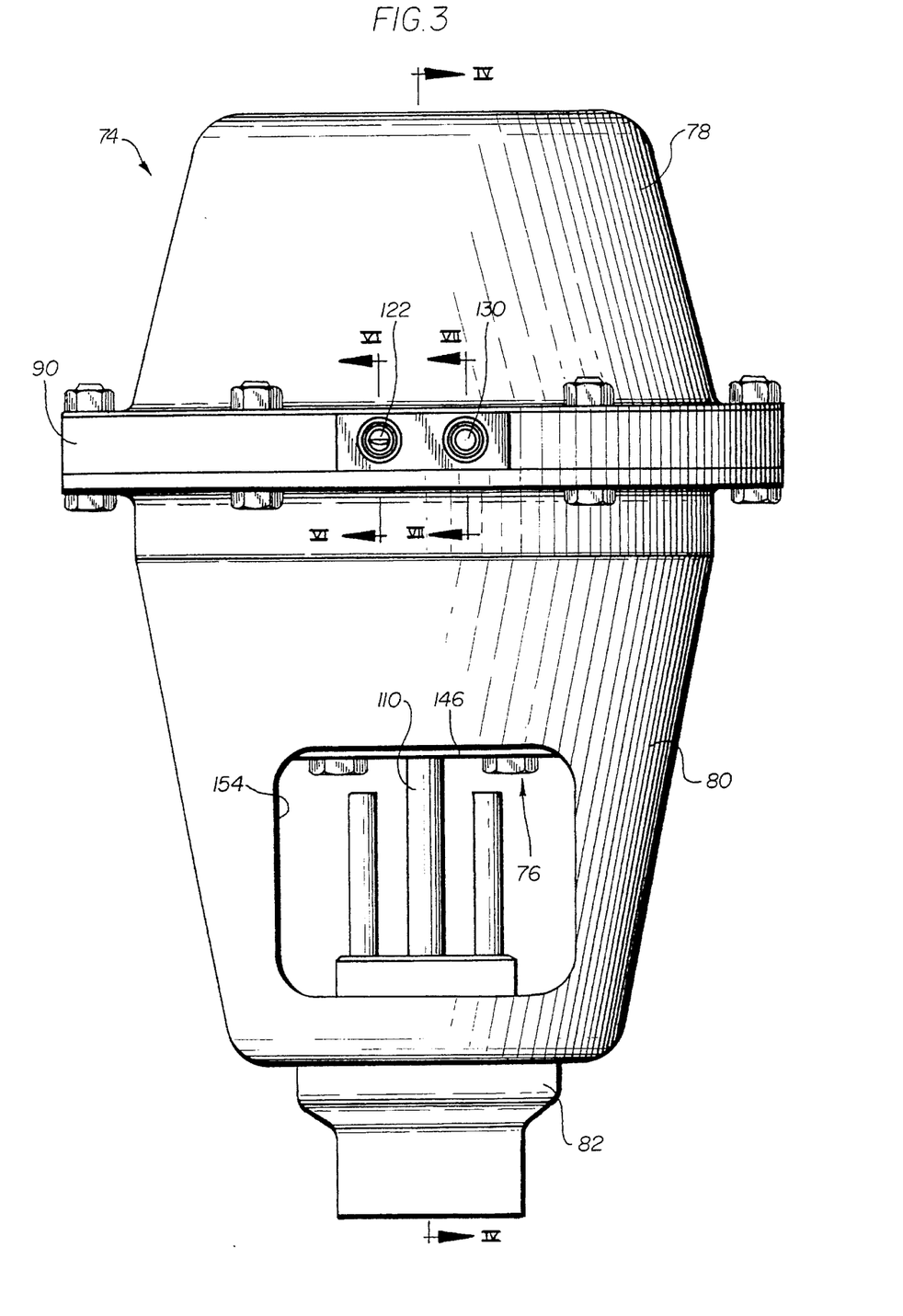
FIG. 3 is an elevational view illustrating a preferred embodiment of a valve actuator according to the principles of the present invention.

FIGS. 1 and 2 schematically illustrate a valve actuator 10 in accordance with the principles of the present invention, the valve actuator being shown in two different operating positions as will be described more particularly hereinafter. In FIG. 1, the valve actuator 10 is coupled to a mechanical control element 12 for controlling for instance a fluid control valve 14, such as a sliding stem valve mounted in a pipeline 16. The actuator 12 can be used to operate a flow control valve 14 of the rotary shaft type through an intermediate motion transfer or motion converting mechanism 18 as shown in FIG. 2.

In any event, the valve actuator 10 includes a reversible power module 20 and a yoke 22 for mounting the power module 20 directly to the fluid control valve 14 or to the motion transfer mechanism 18. The power module 20 includes a stationary inner member 24 and a movable outer member 26 which is axially aligned with the stationary inner member 24.

The stationary inner member 24 is formed as a cylindrical-shaped piston with one end wall 28, the opposite end of the piston being open. The movable outer member 26 is generally cylindrical in shape and surrounds the stationary inner member 24 and includes opposite end walls 30, 32 to form a hollow interior within the outer member 26. The stationary inner member 24 is located within the hollow inner portion of the cylindrical outer member 26 and includes an O-ring seal 34 so that a chamber 36 is defined within the outer member 26 and between the respective ends of the outer member 26 and the inner member 24, i.e. between respective end walls 30 and 28. An inner member wall 38 includes a passageway 40 which communicates with an input port 42 formed in a lateral extension 44 extending from the end wall 38.

An O-ring 46 inserted into the bottom end of the inner member 24 enables a second chamber 48 to be formed generally within the interior of the inner member 24 and defined between the stationary inner member end wall 28 and the movable outer member end wall 32. A lateral extension 50 includes a passageway 52 communicating with the chamber 48 at one end and a port 54 at the other end. The lateral extensions 44, 50 extend through suitable slots 45, 51 in the opposite walls of the movable outer member 26.

Respective connector plates 56, 58 are respectively welded to opposite ends of the movable outer member 26. The connector plate 58 is coupled to the mechanical control element 12 through suitable means such as the illustrated locknuts 60.

A spring 62 is mounted within the chamber 48 and between the end walls 28, 32. An adjustable stop 64 is provided by a threaded bolt 66 threadably engaging the lateral extension 44 with one end 68 butting against a first ledge 70 extending from the outer member 26 as shown in FIG. 2. Thus, the upward movement of the movable outer member 26 can be adjusted through threaded bolt 66 and when the desired stop position is reached, a locknut 72 aids in maintaining the position of the adjustable stop. Therefore, the movable outer member 26 can move between the lowermost position shown in FIG. 1 with respect to the stationary member 24 and the topmost position shown in FIG. 2 when the ledge 70 butts against the bolt stop end 68.

In the operation of the actuator 10 shown in FIGS. 1 and 2, fluid under pressure, such as pneumatic pressure supplied to input port 42 is coupled through passageway 40 into chamber 36 which forces the movable outer member 26 to move upward so as to carry with it the attached mechanical control element 12 which could be a valve stem or motion conversion linkage if used with a rotary shaft valve. In any event, the driven movement of movable outer member 26 compresses spring 62 as shown in FIG. 2 so that the movable outer member 26 has been moved in an upward direction, with respect to the stationary inner member 24, from a first position shown in FIG. 1 to a second actuator position shown in FIG. 2. In a single acting configuration, relieving the pressure in chamber 36 allows the compressed spring 62 to push the movable outer member 26 downwardly so as to return the actuator to the position shown in FIG. 1.

The valve actuator 10 enables a user to readily change between fail-open where the spring force pushes up and fail closed where the spring force pushes down by simply reorienting the power module 20 to couple the respective connector plates 56 or 58 to the mechanical control element 12.

Also, a double-acting actuator operation can be provided by introducing a suitable pneumatic pressure to port 54 which is coupled into the chamber 48 to force the movable outer member 26 downwardly either with or without the assistance of the spring 62. That is, if the springs 62 are utilized in a double-acting actuator operation, the return pneumatic pressure coupled to the lead port 54 for supply to the chamber 48 forces the movable outer member 26 downwardly and can be arranged to do so with or without the assistance of the spring 62. Alternatively, the spring 62 can be eliminated so that the return pneumatic pressure supplied on port 54 will supply all of the force necessary to move the movable outer member 26 downwardly and thereby return the actuator to the position shown in FIG. 1.

Referring now to FIGS. 3–7, there is illustrated a preferred embodiment of a valve actuator with a stationary inner member and a movably driven outer member constructed in accordance with the principles of the present invention. A valve actuator 74 includes a power module 76, a cover 78, and a yoke 80 for mounting the actuator to a valve bonnet 82, with the yoke 80 held in place by a locknut 84 threadably engaged on the bonnet 82 and threaded until locking against the yoke bottom. The power module 76 includes a stationary inner member 86 with lateral extensions 88 integrally formed with a mounting ring 90. The mounting ring 90 is assembled on a mounting flange 91 of the yoke 80 and is mounted to the flange by means of a series of cap screws 92.

Figure 4:
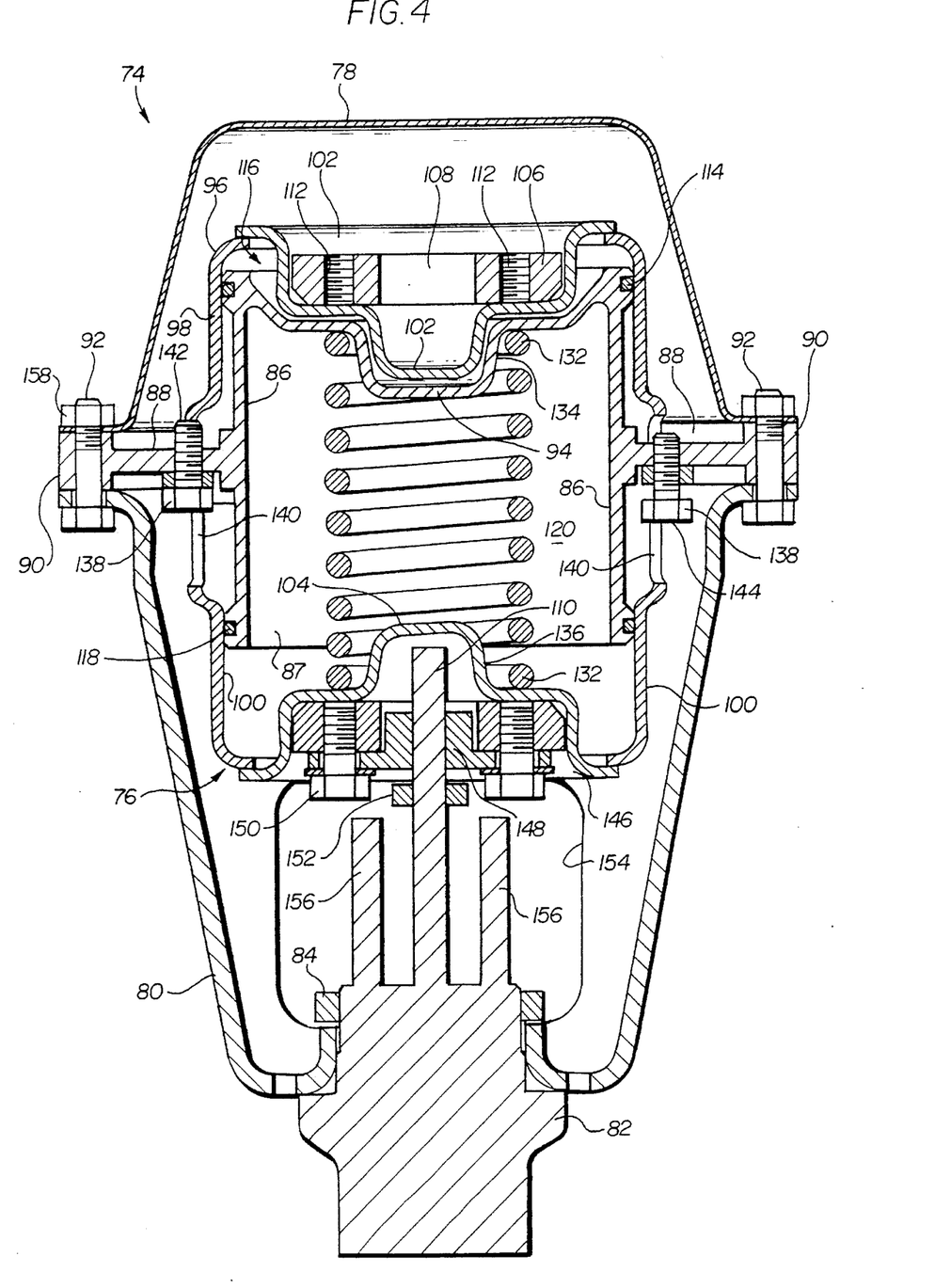
FIG. 4 is a sectional view taken along section line IV—IV of FIG. 3 and illustrating a reversible power module, yoke and cover components of the actuator.
Figure 5:
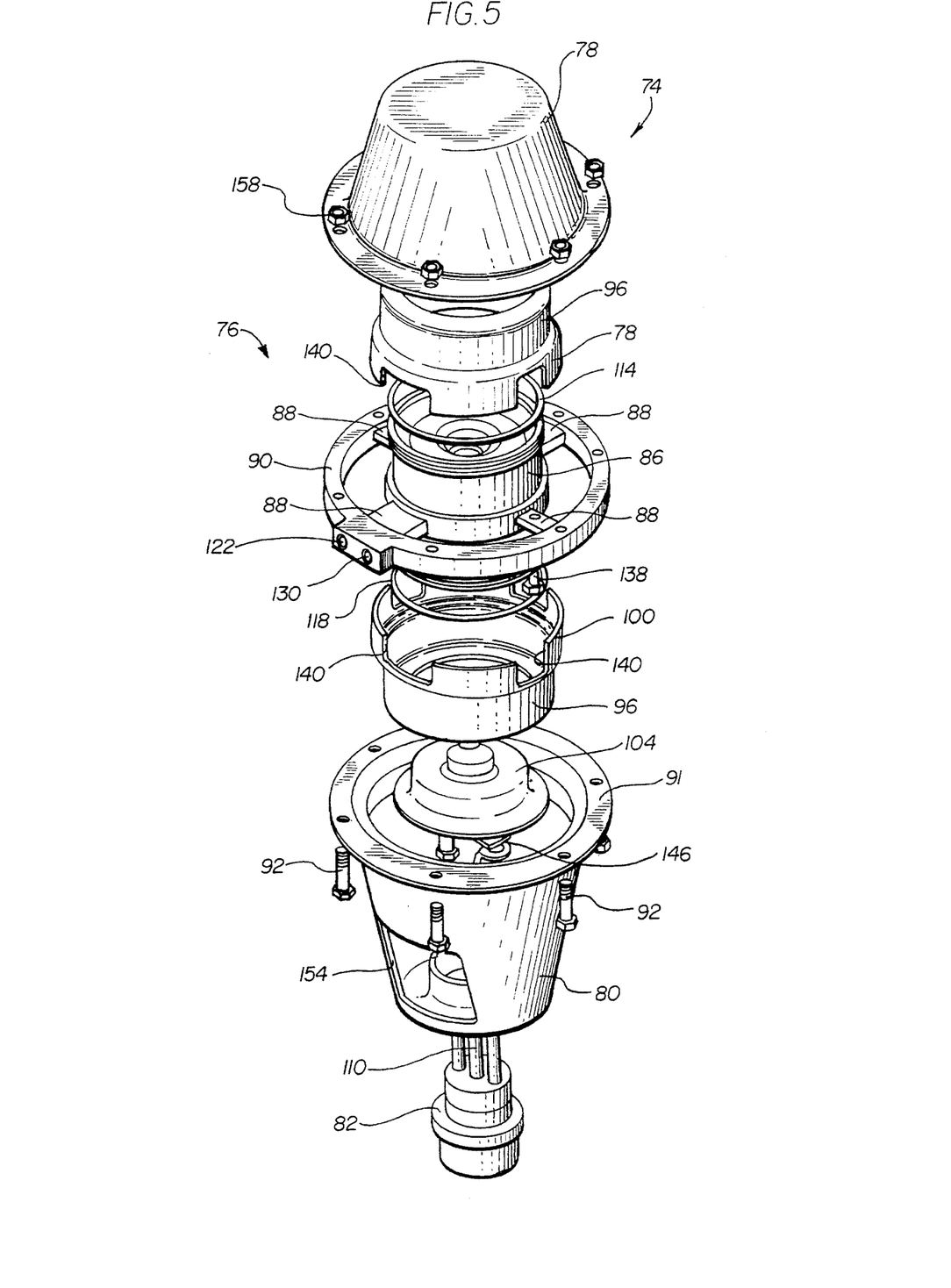
FIG. 5 is an exploded view of the actuator of FIG. 3.

The stationary inner member 86 of the power module 76 is in the form of a stationary piston with an open bottom end 87 as seen in FIG. 4 and an opposite closed end provided by an end wall 94. The power module 76 also includes the movable outer member 96 in the form of a cylindrical canister axially aligned with and surrounding the stationary inner member 86. As shown in the exploded view of FIG. 5, the movable outer member 96 is formed of identical canister half sections 98, 100 which may be welded together to form the movable outer member 96 shown in the assembled view of FIG. 4. A cavity/dome shaped cap 102 is welded to the canister half section 98 to form one end wall of the movable outer member 96, and an identical cavity/dome shaped end wall 104 is welded to the bottom of the canister half section 100 to form the opposite end wall of the movable outer member 96. A respective stem connector plate 106 is welded to the cap 102 and to the cap 104, with each of the stem connector plates 106 including a central aperture 108 for receiving a valve stem 110, and further including a pair of threaded apertures 112. It can be seen therefore that the power module 76 is symmetrically shaped and is reversible by simply removing the cap screws 92 and then inverting the power module 76 so that the cap 102 is on the bottom and the cap 104 is on the top in the reverse of the power module position as seen from FIG. 4.

An upper O-ring seal 114 is suitably mounted in the top of the stationary inner member 86 and in sealing contact with the inner surface of the upper canister half section 98 so as to form a fluid sealed chamber 116 between respective ends of the stationary inner member 86 and the movable outer member 96, i.e. between the inner member end wall 94 and the end wall formed by cap 102. Also, a bottom O-ring 118 is suitably mounted at the bottom of the stationary inner member 86 and in sealing engagement against the inner surface of the canister half section 100 so as to form a chamber 120 primarily within the stationary inner member 86 and extending between the inner chamber end wall 94 and the cavity/dome shaped cap 104 forming the opposite end wall of the canister half section 100.

Figure 6:
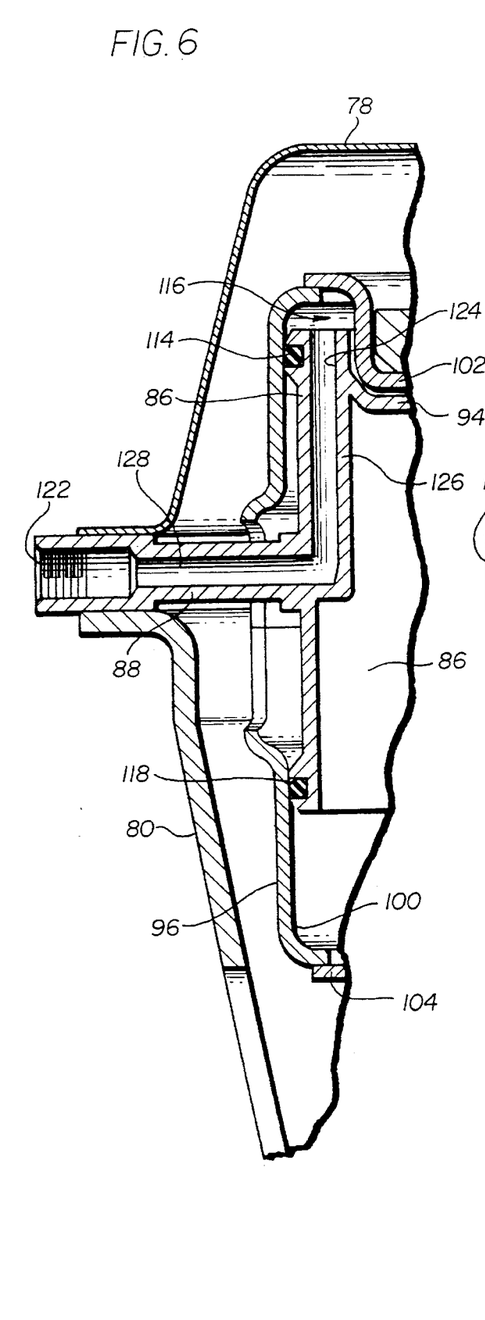
FIG. 6 is a fragmented sectional view taken along section line VI—VI of FIG. 3.

Access to the chamber 116 from a fluid pressure input port 122 is shown in the fragmented view of FIG. 6. A passageway 124 is provided through a thickened wall section 126 in the stationary inner member 86 so that the passageway 124 communicates at one end with the chamber 116 and leads to a connecting passageway 128 through one of the lateral extensions 88 leading to the input port 122. Accordingly, an input fluid pressure such as pneumatic pressure supplied to input port 122 is communicated to the chamber 116 so as to drivingly move the movable outer member 96 upwardly away from the stationary inner member 86 in the same manner as described with respect to the schematic illustrations of FIGS. 1 and 2.

Figure 7:
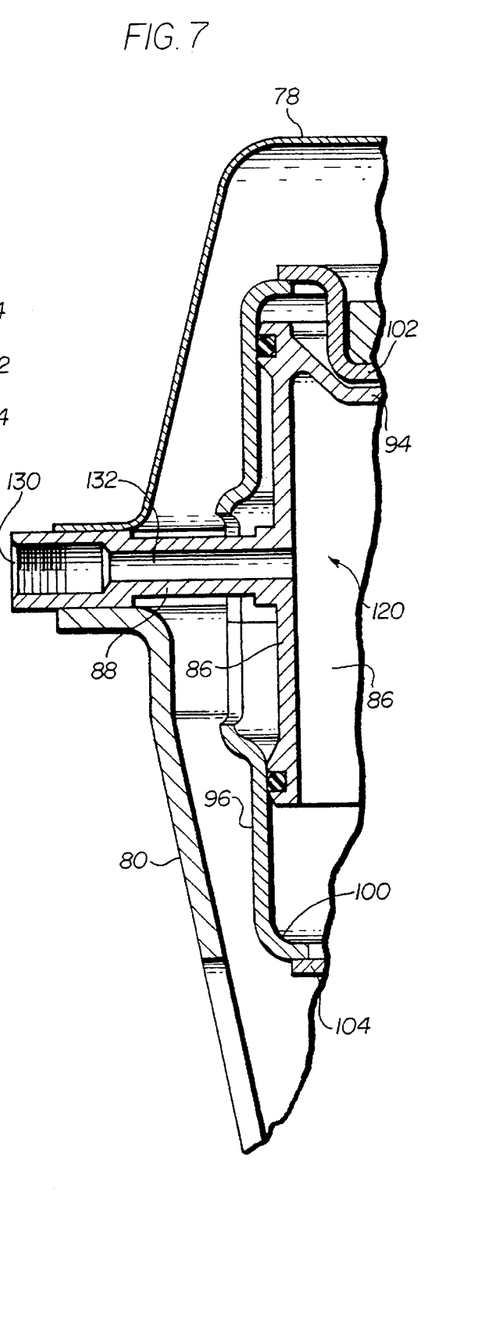
FIG. 7 is a fragmented sectional view taken along section line VII—VII of FIG. 3.

Referring to FIG. 7, there is illustrated the manner in which communication is made between an input port 130 and the chamber 120. Specifically, a passageway 132 extends from the input port 130 within the lateral extension 88 and through the inner wall of the stationary inner member 86 to communicate with the chamber 120. As can be seen from FIG. 3, the input ports 122, 130 are adjacent each other with the respective passageways 128, 132 located in the same lateral extension 88.

A return spring 132 (see FIG. 4) is mounted at one end around a ridge 134 formed by the inner member end wall 94, and at the other end around a ridge 136 formed by the cavity/dome portion of cap 104. For convenience in more clearly illustrating the other actuator components, the spring 132 has not been illustrated in the exploded view of FIG. 5.

Two oppositely disposed adjustable travel stops are provided by respective cap screws 138 threadably by engaging a respective lateral extension 88. As can be seen from FIGS. 4 and 5, each of the lateral extensions 88 extends through a suitable slotted portion 140 formed in the respective canister half sections 98, 100. Thus, the movable outer member 96 slidably moves axially with respect to the stationary inner member 86 with the inside surfaces of the respective canister half sections 98, 100 slidably engaging the O-rings 114, 118. FIG. 4 illustrates that the lowermost position of the movable outer member 96 with respect to the stationary inner member 86 is limited by a stop end 142 of the cap screw 138 shown on the left side of FIG. 4. The cap screw 138 can be threadably adjusted with respect to the lateral extension 88 so as to position the stop end 142 with respect to the top of the slotted section 140 formed in the upper canister half section 98.

Similarly, the cap screw 138 shown on the right side of FIG. 4 can be threadably adjusted in the lateral extension 88 so as to position a stop end 144 with respect to the bottom of the slotted section 140 in the canister half section 100.

A stem connector 146 includes a threaded central boss section 148 with oppositely extending wings having apertures alignable with the threaded apertures 112 of the stem connector plate 106. Cap screws 150 are inserted through the aligned apertures and threadably engaged into the stem connector plate 106 and the power module is securely locked onto the valve stem 110 with a locknut 152. The yoke 80 includes oppositely disposed windows 154 in the yoke housing to permit access to the interior of the yoke during mounting of the actuator onto the valve and for coupling of the power module to the valve control component.

Initially in mounting the valve actuator 74 to the valve, it must be decided whether a fail closed or a fail opened condition of the valve is desired in the event there is a loss of actuator operating pressure. In the illustration of FIG. 4, the actuator is configured to operate with a valve in the fail closed position since it can be seen that if there is no operating pressure supplied to input port 122, the spring 132 maintains the movable outer member 96 in the indicated down position which will normally close the associated fluid control valve.

If it was required that the valve be placed in a fail open situation, then the power module 76 simply needs to be reversed in position. This readily can be accomplished by removing cap screws 92 on the ring 90 and reversing the position of the power module so that the canister half section 100 is at the top and the canister half section 98 is at the bottom with reference to the original position shown in FIG. 4. With the power module 76 so reversed, the power module will initially be in the up position so the valve will be opened, and applying input pressure to input port 122 will move the movable outer member 96 in the downward direction tending to close the valve.

The valve, the valve actuator 74 may be assembled onto the valve-by initially mounting the yoke 80 on the valve bonnet 82 and locking it into position using the lock nut 84. The lock nut 152 and the stem connector 146 can then be threadably mounted onto the valve stem and backed off to a position closer to the valve packing studs 156 and away from the end of the valve stem 110. Next, the power module 76 including the inner stationary member 86 and mounting ring 90 along with the movable outer member 96 is located so that the central aperture 108 of the stem connector plate 106 is mounted over the valve stem and onto the central boss 148 of the stem connector plate 146. The stem connector 146 is threadably rotated on the valve stem one or two turns so as to raise the movable member 96 and slightly compress the spring 132. When the desired position has been reached for the movable outer member 96, the locknut 152 is then tightened against the stem connector plate 146 to lock the power module 76 to the valve stem 110. In the ensuing assembly, the cap screws 150 can be threadably engaged in position as well as the cap screws 92. Finally, the cover 78 is located in position and locked to the assembly by the locknuts 158.

Figure 8:
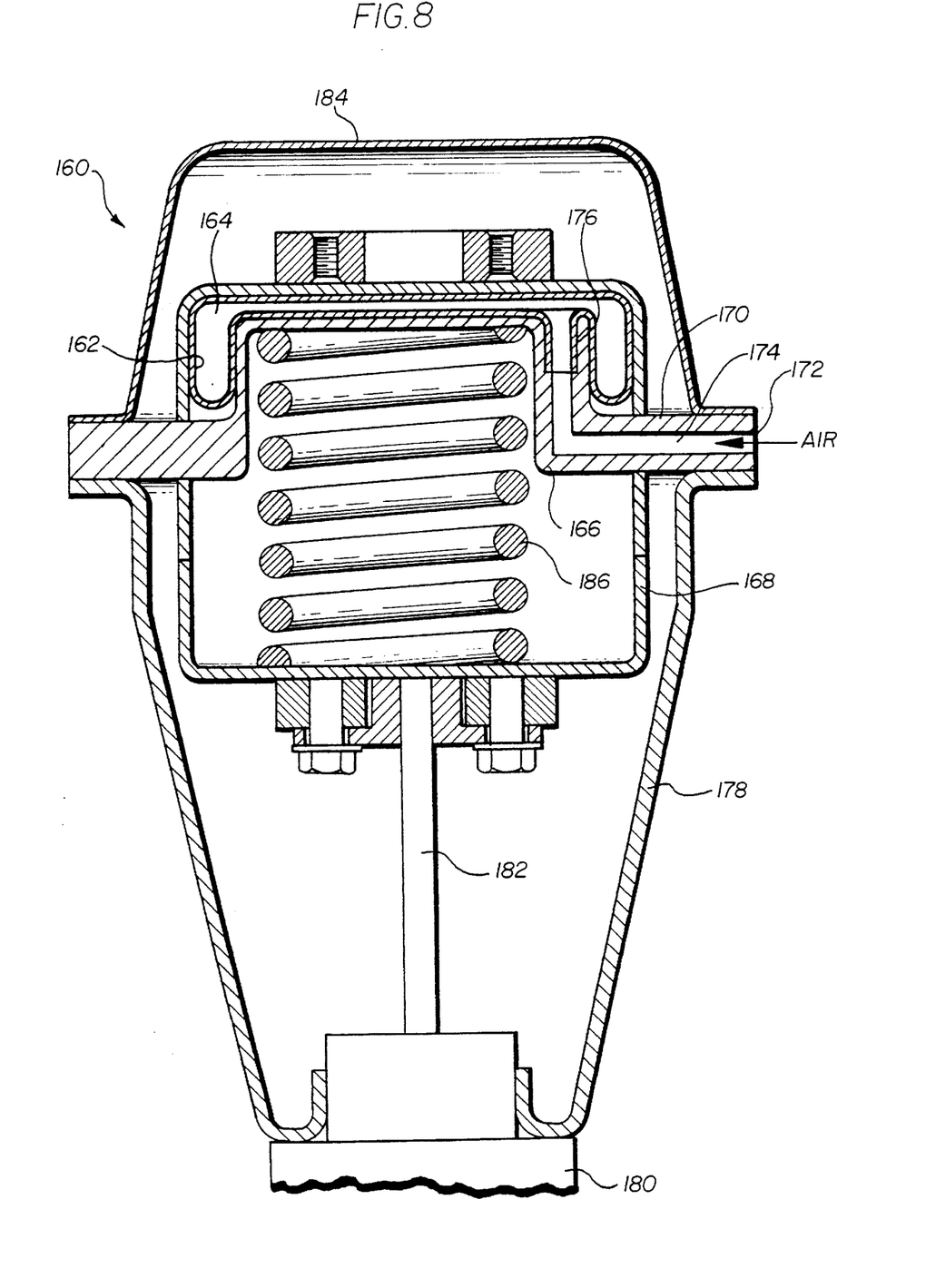
FIG. 8 is a schematic diagram illustrating an alternative embodiment of the invention.

Referring now to FIG. 8, there is illustrated an alternative valve actuator 160 which includes a bladder 162 mounted in the space 164 between a stationary inner member 166 and a movable outer member 168. The stationary inner member 166 includes an extension 170 leading to an input port 172 for receiving the operating fluid pressure for the actuator. A passageway 174 in the extension 170 communicates the input port 172 with the interior space 164 defined within the bladder 162. As shown in FIG. 8, a bladder inlet portion 176 is cemented or otherwise affixed to the inside of the passageway 174 so that upon the coupling of suitable fluid pressure to the input port 172, the movable outer member 168 will move upwardly with respect to the stationary inner member 166 with reference to the illustration of FIG. 8.

The valve actuator 160 further includes a yoke 178 for mounting the actuator to a valve bonnet 180 and for coupling the associated power module to a mechanical control element 182. A cover 184 may be utilized if desired.

It can be seen with reference to FIG. 8 and FIG. 4 that the alternative valve actuator 160 provides a bladder 162 with an associated defined bladder chamber in place of the O-ring seal 114 sealing the chamber 116 in connection with the valve actuator 174. A return spring 186 is used in the valve actuator 160 for returning and biasing the position of the movable outer member 168.

The valve actuator of the present invention with a stationary inner member and a movable outer member provides significant advantages over existing piston actuators and diaphragm actuators, including the following:

1. Lower manufacturing cost in view of (a) fewer component parts, (b) top and bottom of the movable cylinder canister are identical parts, (c) requires minimal machining operations;

2. Smaller compact size;

3. The actuator rod, bushing and stem seal used in current available actuators are not required;

4. Ability to reverse the power module or exchange modules to change the valve action or configuration;

5. More constant and longer guiding of the moving outer member on and with respect to the inner stationary member is maintained through full stroking of the actuator;

6. Ability to pick-up position feedback information from the moving outer member for easy application of a positioner;

7. Equal force output (equal effective area) in either actuator direction;

8. Coupling connection to valve will compensate for any eccentricity between the valve and the actuator thereby preventing undesired wear on the guiding and sealing components in both the valve and the actuator.

Furthermore, rather than utilizing fluid pressure such as the indicated pneumatic pressure source for operating the actuator to drivingly move the movable outer member, other types of moving forces may be utilized for driving the moving member. Accordingly, electromechanical and electronic drives, as well as hydraulic pressures and other gas pressures instead of the described pneumatic air pressure could be coupled to the chamber between the stationary inner member and the movable outer member to operably drive the actuator.

The foregoing detailed description has been given for clearness of understanding only, and no unnecessary limitations should be understood therefrom, as modifications will be obvious to those skilled in the art.

What is claimed:

1. An actuator responsive to fluid under pressure to operate a mechanical control element comprising:

a stationary interior member having an exterior surface;

a movable exterior member coaxially aligned with said stationary interior member and extending around said exterior surface, said movable exterior member movably mounted axially on said stationary member and defining a chamber therebetween;

said movable member coupled to said control element;

means for coupling said chamber to fluid pressure for enabling said movable member to axially move in a first direction; and return means for moving said movable member axially in a second direction.

2. An actuator according to claim 1, wherein said return means includes a spring mounted between said members.

3. An actuator according to claim 1, wherein said chamber is defined between adjacent ends of the stationary interior member and the movable exterior member.

4. An actuator according to claim 1, wherein said coaxially aligned members are formed of coaxial hollow cylindrical members.

5. An actuator according to claim 4, wherein said movable exterior cylindrical member extends beyond the stationary inner cylindrical member and includes opposite end walls.

6. An actuator according to claim 5, wherein said stationary inner cylindrical member includes at least one end wall adjacent a respective movable exterior cylinder member end wall with said chamber defined between said adjacent end walls.

7. An actuator according to claim 1, wherein said return means includes a second chamber defined within said stationary inner member connectable to a fluid pressure for axially moving said movable exterior member with respect to the stationary inner member in the second direction.

8. An actuator according to claim 7, wherein said return means further includes a spring mounted between said members for assisting in moving said movable member axially in the second direction.

9. An actuator according to claim 1, including respective adjustable stop means for adjusting the overall axial movement of said movable member in said first and second directions.

10. An actuator according to claim 1, including an adjustable stop for adjusting the overall axial movement of said movable member in one of said first and said second directions.

11. An actuator according to claim 1, wherein said movable exterior member and said stationary interior member define a power module;

said power module is selectively reversible between a first position and a second position; said first position being a position in which expansion of said chamber moves said movable exterior member generally toward said control element; said second position being a position in which expansion of said chamber moves said movable exterior member generally away from said control element.

12. An actuator according to claim 1, including a bladder mounted in said chamber, said bladder defining an interior space for receiving fluid.

13. An actuator for operating a control element used to regulate the flow of fluid through a fluid control valve said actuator comprising:

a pair of coaxially aligned members, one externally mounted with respect to the other and axially movable with respect to the other, said members having adjacent ends, wherein a chamber is defined between said adjacent ends for moving said one movable member away from said other member during operation of said actuator;

means for coupling said control element to said one movable member;

means for coupling said chamber to fluid under pressure for operating said actuator and moving said one movable member away from said other member from a first valve actuator position to a second valve actuator position; and return means for axially moving said one movable member towards said other member from said second valve actuator position to said first valve actuator position.

14. A combined fluid valve and valve actuator apparatus comprising:

a fluid control valve including a flow control element for controlling the flow of fluid through a pipeline;

a valve actuator including, (a) a stationary inner member mounted to said fluid control valve;

(b) a movable outer member coaxially aligned with and movably mounted axially on said stationary member, said movable outer member and said stationary member having adjacent ends, wherein a chamber is defined between said adjacent ends;

(c) means for coupling said movable member to said flow control element;

(d) means for coupling said chamber to an actuator fluid pressure source for moving said movable member axially on said stationary member from a first valve actuator position to a second valve actuator position to correspondingly control the flow of fluid through said fluid valve; and (e) return means for moving said movable member axially from said second valve actuator position to said first valve actuator position.

15. An actuator responsive to fluid under pressure to operate a mechanical control element comprising:

a stationary interior member;

a movable exterior member coaxially aligned with and movably mounted axially on said stationary member, said movable exterior member and said stationary member having adjacent ends;

a chamber defined between said adjacent ends of said members;

said movable member coupled to said control element;

means for coupling said chamber to fluid pressure for enabling said movable member to axially move in a first direction; and return means for moving said movable member axially in a second direction.

* * * * *